United States Patent [19]

Gebauer

[11] Patent Number: 5,631,085
[45] Date of Patent: May 20, 1997

[54] COMPOUND YARN PRODUCING THE SLIDING LAYER OF PLAIN BEARINGS MADE OF FIBER-REINFORCED THERMOPLASTICS

[75] Inventor: Elke Gebauer, Bobingen, Germany

[73] Assignee: Hoechst Aktiengesellschaft, Germany

[21] Appl. No.: 116,139

[22] Filed: Sep. 2, 1993

[30] Foreign Application Priority Data

Sep. 4, 1992 [DE] Germany ............ 42 29 581.5

[51] Int. Cl.$^6$ .................. D02G 3/04; D02G 3/36; D04C 1/06
[52] U.S. Cl. ................. 428/377; 428/357; 428/359; 428/361; 428/370; 428/373; 428/374; 428/378; 428/383; 428/397; 57/253
[58] Field of Search ................. 428/252, 357, 428/359, 361, 370, 373, 374, 377, 378, 383, 397; 57/253

[56] References Cited

U.S. PATENT DOCUMENTS

| | | | |
|---|---|---|---|
| 2,953,418 | 9/1960 | Runton et al. | 308/238 |
| 3,692,375 | 9/1972 | Matt et al. | |
| 3,765,978 | 10/1973 | Matt | 156/148 |
| 3,815,468 | 6/1974 | Matt et al. | 87/1 |
| 3,832,255 | 8/1974 | Shobert | 156/148 |
| 3,864,197 | 2/1975 | Shobert | 161/96 |
| 4,074,512 | 2/1978 | Matt | 57/140 |
| 4,800,113 | 1/1989 | O'Connor | 428/175 |
| 4,877,813 | 10/1989 | Jinno et al. | 525/146 |
| 5,112,901 | 5/1992 | Buchert et al. | 524/494 |

FOREIGN PATENT DOCUMENTS

| | | |
|---|---|---|
| 2341333 C2 | 2/1975 | Germany . |
| 2150847 | 1/1981 | Germany . |
| 2302206 | 10/1982 | Germany . |
| 2341333 | 4/1985 | Germany . |
| 3916137 | 11/1990 | Germany . |
| 1228503 | 4/1971 | United Kingdom . |
| 2 230 795 A | 10/1990 | United Kingdom . |

*Primary Examiner*—Patrick Ryan
*Assistant Examiner*—Rich Weisberger
*Attorney, Agent, or Firm*—Connolly & Hutz

[57] ABSTRACT

There are described a multicomponent compound yarn composed of at least three components, wherein a first component comprises from 40 to 70 percent by volume of thermoplastic fibers, a second component comprises from 10 to 30 percent by volume of polyfluorocarbon fibers, and a third component comprises from 10 to 50 percent by volume of fiber made of a polymer whose melting point is at least 20° C. above the melting point of the fibers of the first component, and processes for producing it. The multicomponent compound yarn described is used for producing the sliding layer of plain bearings or of sliding ring seals.

4 Claims, No Drawings

COMPOUND YARN PRODUCING THE SLIDING LAYER OF PLAIN BEARINGS MADE OF FIBER-REINFORCED THERMOPLASTICS

The present invention relates to a compound yarn for producing plain bearings, in particular the sliding layer of plain bearings made of fiber-reinforced thermoplastics.

Plain bearings are bearings where a moving part (usually a shaft) slides on sliding surfaces in a fixed cup in the bearing housing. The advantages of plain bearings are that they act as shock absorbers, are silent-running, allow very precise guidance of the shaft and have an extremely long life in sustained use. Between the sliding surface of the plain bearing and the surface of the shaft moving therein there occurs sliding friction, which is minimized by lubrication. Plain bearings should have the best possible dry running properties for the initial and final phases of the turning movement and in case there is a shortage of lubricant. To attempt to meet this requirement, specific materials have been chosen in the art for the bearings. For instance, plain bearing cups have been made of metals having a particularly low surface friction but also of asbestos or graphite. It is also already known to make plain bearings from plastic composite materials. U.S. Pat. No. 2 953 418 describes a plastic plain bearing and a process for making it, in which a polytetrafluoroethylene (Teflon) fiber yarn is twisted or overwrapped with a heat-shrinkable, resin-compatible polyamide yarn. The compound yarn thus obtained is impregnated with a heat-curable resin, for example a phenolic or epoxy resin, wound as a spiral onto a core to form the bearing and subjected to a heat treatment to cure the resin. A similar method for making plastic plain bearings is known from British Patent 1,228,503, where a glass fiber bundle covered with a polytetrafluoroethylene/cotton compound yarn and then thoroughly impregnated with a heat-curable resin which may additionally contain finely divided polytetrafluoro-ethylene particles. The resulting linear fibrous structure is wound into the shape of the bearing and the resin is cured.

A similar concept is revealed in DE-B-2 150 847. This reference describes a sliding layer material for bearings, which comprises a compound yarn obtained by loosely twisting polytetrafluoroethylene filaments with polyamide filaments and impregnated with a heat-curable resin.

DE-C-2 302 206 discloses a process for producing a low-friction sliding layer material for bearings, wherein strands of essentially twistless polyamide filaments and strands of essentially twistless polytetrafluoroethylene filaments are braided by a special braiding technique about a core in such a way that a hoselike textile fabric structure results on the surface of the core. This structure is impregnated with a curable resin, for example an epoxy or phenolic resin, and cured. A similar method for producing bearings is known from U.S. Pat. No. 3 692 375, in which likewise strands of yarns having a low coefficient of friction, made for example of polytetrafluoroethylene, and yarns composed of reinforcing fibers, for example glass fibers, are braided crosswise about a mandrel and the resulting hoselike fibrous braid is impregnated with a weavelike fibrous braid is impregnated with a heat-curable resin, for example an epoxy resin, and cured.

DE-C-2 341 333 likewise discloses a process for producing plain bearings where cords of polytetrafluoroethylene multifilament yarns are braided on a mandrel to form a weavelike hose, which is then impregnated with a heat-curable resin and subsequently cured.

It is common to all these known processes for making fiber-reinforced plastic plain bearings that the fibers are embedded in a matrix of a heat-curable resin, for example a curable, unsaturated polyester resin, a phenolic resin, melamine resin or epoxy resin. One disadvantage in the making of plain bearings using a matrix of thermosetting resin is that it is difficult to impregnate the fiber strands wound or braided on the mandrel homogeneously with the liquid resin. This is especially so when the yarns used will as usual still contain a size.

DE-A-3 916 137 discloses a plain bearing made of fiber-reinforced thermally stable thermoplastics. Yet it is stated in the document that polytetrafluoroethylene materials are not suitable for making at least this type of plain bearing, since they tend to "creep" even at low temperatures, for example at room temperature, and low pressures. The reference therefore proposes winding compound yarns composed of reinforcing fibers, for example of glass, carbon or aromatic polyamides, and thermoplastic fibers, ribbons or particles having a melting point of above 180° C., preferably above 200° C., to form a plain bearing on a mandrel and heating the winding to a temperature above the melting point of the thermoplastic materials. In the course of this treatment the thermoplastic particles, fibers or ribbons melt and fill the voids between the unmeltable fiber, so that a dimensionally stable plain bearing is obtained on cooling.

It is true that the plain bearings known from DE-A-3 916 137 are made of a fiber-reinforced thermoplastic, but they do not contain anything to enhance the sliding. on the contrary, the stated object of the invention described in said reference is to avoid the use of polytetrafluoroethylene and other extremely slidable polymers, since they are very prone to creep. However, these known plain bearings have unsatisfactory dry running properties.

It has now been found that plain bearings having very good dry running properties are obtained when at least the sliding layer of the plain bearing is made of a fiber-reinforced thermoplastic which can be constructed by winding the below-described multicomponent compound yarn.

The present invention accordingly provides the multicomponent compound yarn suitable for making the sliding surface of these plain bearings. Said yarn is composed of at least three components and comprises as the first component from 40 to 70 percent by volume of thermoplastic fibers, as the second component from 10 to 30 percent by volume of polyfluorocarbon fibers and as the third component from 10 to 50 percent by volume of fiber made of a polymer whose melting point is at least 200° C. above the melting point of the fibers of the first component. Preferably the multicomponent compound yarn comprises 40–60% by volume of the first fiber component, 10–30% by volume of the second and 10–30% by volume of the third.

Fibers for the purposes of the present invention include not only staple fibers but also continuous filament fibers. The multicomponent yarn of the invention can for example contain all the three abovementioned components in the form of uniformly distributed staple fibers. However, it is also possible for one or two components to be in the form of continuous filament fibers and the others or other in the form of staple fibers. Preferably, however, all the three components are present in the form of continuous filament fibers.

The staple length of staple fibers which can be present in the compound yarns of the invention is chosen to be such that the fibers are spinnable. For fibers having a linear density between 1 and 10 dtex it is advantageous to have a staple length of above 10 to 20 mm, while higher linear densities are combined with correspondingly higher staple lengths.

The three components of the multicomponent compound yarn of the invention can be present in the yarn in perfectly random distribution. Such a compound yarn according to the invention can be obtained by subjecting an appropriate staple fiber blend to conjoint secondary spinning, but is preferably obtained by subjecting low- or zero-twist continuous multifilament strands of the three fiber components to conjoint jet intermingling.

It has surprisingly been found, however, that it is more advantageous for there to be statistically uniformly distributed over the cross-section of the compound yarn a multiplicity of regions in which the fibers of each component predominate in turn. Such a compound yarn according to the invention is prepared by folding feed yarns each consisting of one of the compound yarn components. The folding can be carried out in a conventional manner, but is advantageously carried out by conjoint twisting or by braiding.

Particular preference is given to multicomponent compound yarns of the invention wherein there are statistically uniformly distributed over the cross-section of the compound yarn a multiplicity of regions in which the fibers of the second component are more closely combined with at least some of the fibers of the third component, i.e. in which the fibers of the second component are present in a statistically uniform distribution with at least some of the fibers of the third component or all the regions of the second fiber component are immediately adjacent to regions of the third fiber component.

These particularly preferred multicomponent compound yarns of the invention are obtained when the yarns of the second component and of the third component are first jet intermingled or twisted with one another. Yet it is not necessary here for the yarn of the second component to be jet intermingled or twisted with all of the yarn of the third component; instead it is also possible to divide the linear density of the feed yarn of the third component into two yarns and initially to jet intermingle or twist one of these yarns with the yarn of the second component. In this case from 20 to 60% of the linear density of the third yarn component envisaged for producing the compound yarn of the invention are combined with the yarn of the second yarn component. The resulting compound yarn from the second component and part of the third component of the multicomponent compound yarn of the invention is then folded with the remaining linear density of the third yarn component and with the yarn of the first component. In this two-stage production process it is advantageous to use opposite folding twists in the first and second stage.

The feed yarn of the first component is advantageously used in the form of a twistless filament strand or in the form of a yarn having only a low twist of not more than 100 turns per meter, for example having a protective twist of from 10 to 30 turns per meter.

The total linear density of the multicomponent compound yarn of the invention is advantageously between 500 and 5000 dtex. Particular preference is given to linear densities of from 100 to 2000 dtex for the yarns of the first component, of from 100 to 1000 dtex for the filaments of the second component and of from 100 to 500 dtex for the filaments of the third component.

The linear densities of the fibers of the multicomponent compound yarn are preferably within the range between 1 and 15 dtex. Finer fiber linear densities can of course be used, but, owing to the higher manufacturing costs, are necessary only when a particularly soft, compliant and flexible multicomponent compound yarn is to be produced, for example for winding particularly precise plain bearings.

Linear densities above 10 dtex can likewise be used, as long as this does not impair the elasticity and windability of the multicomponent yarns according to the invention to an unacceptable degree. Particular preference is given to filament linear densities of from 1 to 7 dtex for the filaments of the first component, of from 2 to 8 dtex for the filaments of the second component and of from 4 to 12 dtex for the filaments of the third component.

The fibers of the first yarn component (hereinafter also called matrix yarn) are made of a thermoplastic polymer. In the sliding surface of the ready-produced plain bearing, the material of this yarn component forms the matrix in which the filaments of the second and third yarn components are uniformly distributed and embedded. The choice of the thermoplastic polymer material is therefore made with reference to the requirement profile, in particular as regards the likely operating temperature of the plain bearing. Suitable thermoplastic polymers are for example polyolefins having a melting point between 150° and 200° C., polyamides such as nylon 6, nylon 66 and nylon 46 having melting points between 220° and 295° C., aromatic polyamides having melting points above 300° C., polyesters such as polybutylene terephthalate and polyethylene terephthalate having melting points between 225° and 250° C., aromatic polyesters having melting points above 250° C., polycarbonate having a melting point of about 225° C., polyphenylene ethers having a melting point of 215° C., polyarylene sulfides having melting points between 250° and 300° C., e.g. polyphenylene sulfide having a melting point of 276° C., thermoplastic polyimide or polyether-imide having melting points of 215° to 260° C., polysulfone having a melting point of 180° to 190° C., polyamide-imide having a melting point of 280° C., polyether sulfone having a melting point of 220° to 230° C., also the polyether ketones PEK, PEEK, PEKEKK, PEEKK, PEKK having melting points between 340° and 410° C.

The second fiber component of the multicomponent compound yarn of the invention is made of polyfluorocarbons, in particular of the melt-spinnable types as described in DE-A-4 131 746. From this group of known polyfluorocarbons it is necessary to make a choice in such a way that the melting point of the fibers of the second component too is at least 20° C., preferably at least 50° C., above the melting point of the fibers of the first component.

The material of the third fiber component can be organic or inorganic and the organic fibers can be made of natural, semi-synthetic or synthetic polymers. Suitable inorganic fibers are for example carbon fibers or glass or ceramic fibers. Preference for use as the third fiber component is given to organic fibers, suitable natural fibers being in particular cellulose fibers. Suitable semi-synthetic fibers are regenerated cellulose or acetylcellulose fibers. However, particular preference is given to synthetic fibers, in particular to those made of polyacrylonitrile or one of the abovementioned thermoplastic materials.

If fibers of the third component are made of a thermoplastic material, care must be taken to ensure that the melting point of the polymer chosen for that purpose is at least 20° C., preferably at least 50° C., above the melting point of the first fiber component. In the sliding layer of the ready-produced plain bearing the fibers of the third component of the multicomponent compound yarn of the invention form the stabilizing, strength-conferring reinforcing fiber and they surprisingly also act as an adhesion promoter.

Examples of pairs of materials which can be used for the first and third components of the multicomponent compound yarn of the invention are polyester matrix yarn combined with polyacrylonitrile reinforcing fibers, polyester matrix yarn combined with polyphenylene sulfide reinforcing fibers, polyphenylene sulfide matrix yarn combined with polyether ketone reinforcing fibers and polyolefin matrix yarn combined with polyester reinforcing fibers.

The multicomponent compound yarn of the invention is preferably used for producing the sliding surfaces of plain bearings, but can also be used with advantage for producing other construction elements such as sliding ring seals. To produce plain bearings, for example, the yarn is wound on a mandrel, the winding is fixed, for example by applying a further, protective winding of polytetrafluoroethylene-free compound yarn of a lower and a higher melting fiber component, and the winding is heated to a temperature which is above the melting point of the fibers of the first yarn component of the compound yarn of the invention but below the melting point of the fibers of the second and third yarn components. The thermoplastic fibers of the first yarn component melt together to form a homogeneous matrix embedding the fibers of the second and third yarn components. After cooling the winding, the plain bearing obtained can be removed from the mandrel.

To illustrate the present invention, the production of multicomponent compound yarns according to the invention will now be described by way of example.

EXAMPLE 1

A loosely twisted polytetrafluoroethylene yarn 455 dtex f 60×1 having a protective twist of 25 turns per meter and a polyphenylene sulfide yarn 220 dtex f 96×1 are twisted together with 185 turns per meter of Z twist. This folded yarn is twisted together with a polyphenylene sulfide yarn 220 dtex f 96×3 Z 185 and a polyethylene terephthalate yarn (®Trevira hochfest) 1100 dtex f 200×2 Z 185 with 135 turns per meter of S twist. The cabled yarn obtained is a compound yarn according to the invention which has a total linear density of 3535 dtex and comprises 58.5% by volume of polyester fibers, 23.1% by volume of polyphenylene sulfide fibers and 18.4% by volume of polytetrafluoroethylene fibers, and is suitable for producing sliding surfaces for plain bearings having good dry running characteristics.

EXAMPLE 2

A loosely twisted polytetrafluoroethylene yarn 455 dtex f 60×1 having a protective twist of 10 turns per meter and a polyphenylene sulfide fiber strand 220 dtex f 96×1 are jet intermingled and then twisted together with 185 turns per meter of Z twist. This folded yarn is twisted together with a polyphenylene sulfide yarn 220 dtex f 96×3 Z 185 and a polyethylene terephthalate yarn (®Trevira hochfest) 1100 dtex f 200×2 Z 185 with 135 turns per meter of S twist. The cabled yarn obtained is a compound yarn according to the invention which has a total linear density of 3535 dtex and comprises 58.5% by volume of polyester fibers, 23.1% by volume of polyphenylene sulfide fibers and 18.4% by volume of polytetrafluoroethylene fibers, and is suitable for producing sliding surfaces for plain bearings having good dry running characteristics.

EXAMPLE 3

A loosely twisted polytetrafluoroethylene yarn 455 dtex f 60×1 having a protective twist of 25 turns per meter and a polyether-imide yarn 380 dtex f 48×1 are twisted together with 185 turns per meter of Z twist. This folded yarn is twisted together with a polyether-imide yarn 380 dtex f 48×2 Z 185 and a polyethylene terephthalate yarn (®Trevira hochfest) 1100 dtex f 200×2 Z 185 with 135 turns per meter of S twist. The cabled yarn obtained is a compound yarn according to the invention which has a total linear density of 3795 dtex and comprises 55.5% by volume of polyester fibers, 26.6% by volume of polyether-imide fibers and 17.6% by volume of polytetrafluoroethylene fibers, and is suitable for producing sliding surfaces for plain bearings having good dry running characteristics.

What is claimed is:

1. A multicomponent compound yarn composed of at least three components comprising a first component of from 40 to 70 percent by volume of thermoplastic fibers having a melting point above the use temperature Of the yarn, a second component of from 10 to 30 percent by volume of polyfluorocarbon fibers, and a third component of from 10 to 50 percent by volume of fiber made of a polymer whose melting point is at least 20° C. above the melting point of the fibers of the first component, and wherein the component fibers are statistically uniformly distributed over the cross-section of the compound yarn in a multiplicity of regions in which the fibers of each component predominate in turn.

2. The multicomponent compound yarn of claim 1, wherein the fibers of each component of the compound yarn are continuous filament fibers.

3. The multicomponent compound yarn of claim 1, wherein the first and third components of the multicomponent compound yarn of the invention comprise the following pairs of materials:

polyester matrix yarn combined with polyacrylonitrile reinforcing fibers, polyester matrix yarn combined with polyphenylene sulfide reinforcing fibers, polyphenylene sulfide matrix yarn combined with polyether ketone reinforcing fibers, or polyolefin matrix yarn combined with polyester reinforcing fibers.

4. The use of a multicomponent compound yarn of claim 1 for producing the sliding layer of plain bearings or of sliding ring seals.

* * * * *

UNITED STATES PATENT AND TRADEMARK OFFICE
CERTIFICATE OF CORRECTION

PATENT NO. : 5,631,085
DATED : May 20, 1997
INVENTOR(S) : Elke Gebauer

It is certified that error appears in the above-indentified patent and that said Letters Patent is hereby corrected as shown below:

Column 1, line 35, after "bundle" insert -- is --.

Column 2, line 47, "200°C" should read -- 20°C --.

Column 6, line 23, (claim 1, line 1), "yam" should read -- yarn --; and in line 26 (claim 1, line 4), "Of the yam" should read -- of the yarn --.

Signed and Sealed this

Twenty-sixth Day of August, 1997

Attest:

BRUCE LEHMAN

*Attesting Officer*    *Commissioner of Patents and Trademarks*